United States Patent [19]

Parson

[11] Patent Number: 5,349,334
[45] Date of Patent: Sep. 20, 1994

[54] WIND VELOCITY SIGNALLING APPARATUS

[76] Inventor: Ronald W. Parson, 4185 Hutcheson Ferry Rd., Whitesburg, Ga. 30185

[21] Appl. No.: 61,293

[22] Filed: May 14, 1993

[51] Int. Cl.$^5$ ............................................ G01W 1/00
[52] U.S. Cl. ................................ 340/601; 340/611; 73/861.76; 73/861.77; 73/170.07; 73/170.05
[58] Field of Search .................... 340/601; 73/170.02, 73/170.03, 170.06, 170.07, 170.08, 170.11, 861.76, 861.77

[56] References Cited

U.S. PATENT DOCUMENTS 4,034,174  7/1977  McCord ........................... 340/601 X
4,548,074 10/1985  Krueter ............................ 73/170.02

*Primary Examiner*—Jeffery A. Hofsass

[57] ABSTRACT

A new and improved wind velocity signalling apparatus includes a first wind velocity sensing and signalling assembly which is connected to a support structure (such as a gabled roof) and which senses and signals the occurrence of wind of a predetermined velocity. An alarm assembly sounds an alarm upon receiving a signal from the first wind velocity sensing and signalling assembly upon occurrence of the predetermined wind velocity. The first wind velocity sensing and signalling assembly includes a wind scoop assembly for receiving wind, a wind vane fixed onto the wind scoop assembly for directing the wind scoop assembly into the wind, and a bearing assembly connected between the wind scoop assembly and the roof. A wind velocity sensor assembly receives wind pressure from wind scooped up by the wind scoop assembly and senses a predetermined wind velocity. The wind velocity sensor assembly includes a wind-pressure-responsive member which is in communication with wind scooped up by the wind scoop assembly and which is responsive to a first force exerted by the wind pressure. A counterforce assembly exerts a predetermined counterforce on the wind-pressure-responsive member against the first force exerted by the wind pressure. An electric circuit completion assembly, connected to the counterforce assembly, signals the alarm assembly when the first force exerted by the wind pressure on the wind-pressure-responsive member exceeds the predetermined counterforce exerted by the counterforce assembly on the wind-pressure-responsive member.

4 Claims, 3 Drawing Sheets

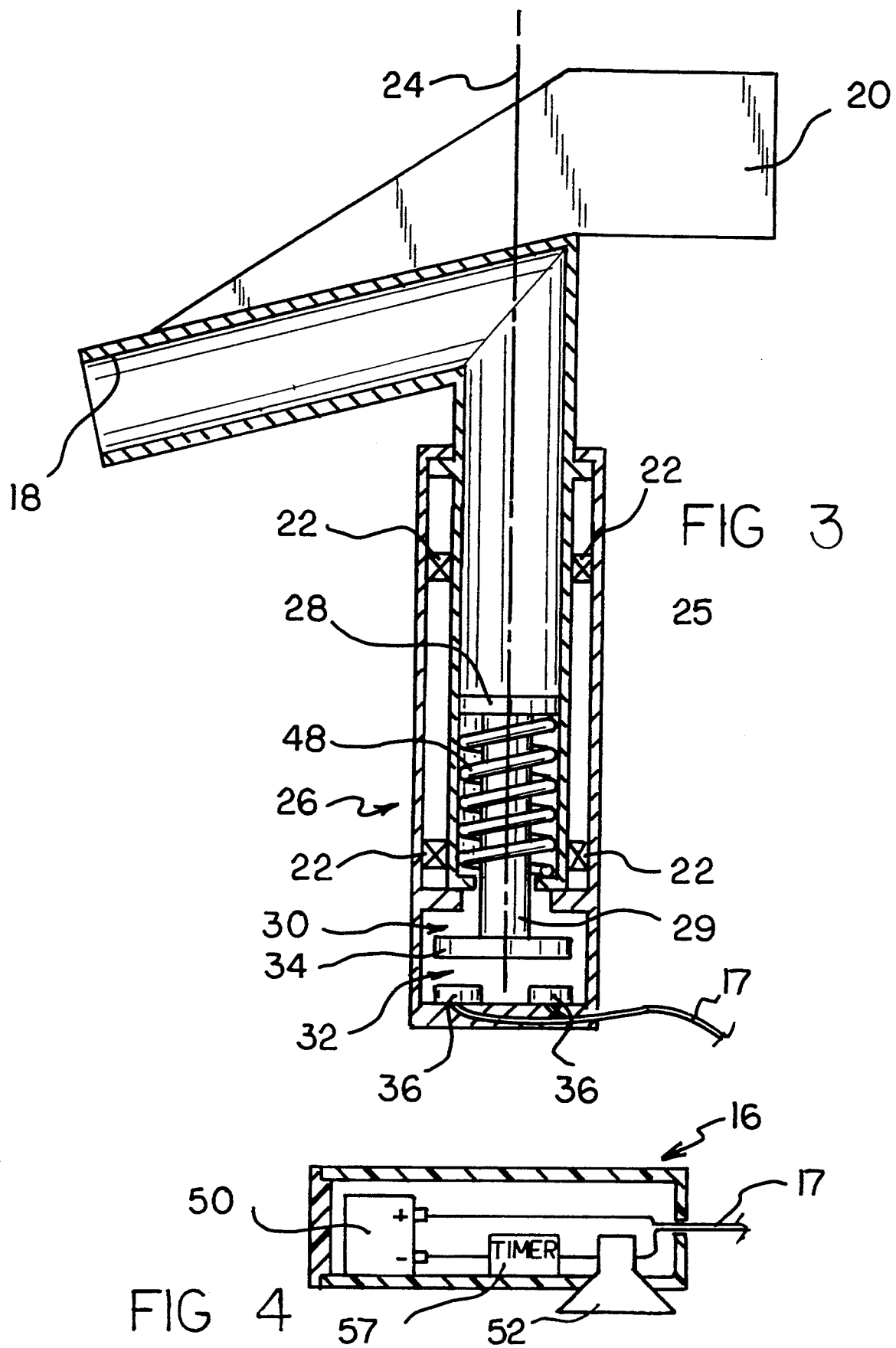

WIND VELOCITY SIGNALLING APPARATUS

BACKGROUND OF THE INVENTION

1. Field of the Invention

The present invention relates generally to wind detectors, and more particularly, to a device for detecting and signalling the occurrence of wind velocity greater than a predetermined level.

2. Description of the Prior Art

High velocity winds can be dangerous to life and limb and can be very damaging to property. In this respect, devices have been developed to warn persons of the occurrence of high velocity winds. For example, the following U.S. patents relate to devices for wind velocity detection and signalling: U.S. Pat. No. 3,534,191; 3,964,038; 4,488,431; 4,548,074; and 4,669,304. More specifically, U.S. Pat. No. 3,534,191 discloses a wind velocity indicator and alarm that includes a wind-responsive device on a lever for making an electrical contact for actuating an alarm. The wind-responsive device is like a pendulum, having a wind-responsive device suspended on a free-swinging arm. A problem associated with such free-swinging wind-responsive devices is the possibility of resonant action taking place to give erroneous wind readings. More specifically, if a little puff of wind happens to give the wind-responsive device a little push on a down swing, then the wind-responsive device can give erroneously high results due to resonance additive effects. Likewise, if a little puff of wind happens to give the wind-responsive device a little push on a up swing, then the wind-responsive device can give erroneously low results due to resonance subtractive effects. In this respect, it would be desirable if a wind-responsive device were provided which was not susceptible to additive and subtractive effects due to resonance.

U.S. Pat. No. 3,964,038 employs a rocking arm as a wind-responsive device. The rocking arm is susceptible to the resonance effects discussed above in relation to U.S. Pat. No. 3,534,191.

U.S. Pat. No. 4,488,431 discloses a wind speed and direction indicator that employs a large magnetic compass. Designing and building such large compasses such as used with this device is a complex and expensive task. In this respect, it would be desirable if a wind-responsive device were provided which did not employ a magnetic compass.

U.S. Pat. No. 4,548,074 discloses a wind speed and direction indicator that employs an anemometer and a wind direction indicator sharing a common rotational axis. As such, distinguishing between signals relating to wind velocity from the anemometer must be distinguished from signals due to the wind direction indicator. More specifically, a complex arrangement of electrical coils, actuators, and gaps are employed. In this respect, it would be desirable if a wind-responsive device were provided that did not require a complex arrangement of electrical coils, actuators, and gaps to indicate wind velocity and direction.

U.S. Pat. No. 4,669,304 discloses a wind direction indicator which visually indicates the direction the wind is blowing. No provision is made for measuring or indicating wind velocity. No provision is made for signalling the presence of wind that exceeds a predetermined velocity. In this respect, it would be desirable if a wind-responsive device were provided which permitted remote monitoring of wind velocity.

There are two aspects of wind velocity that the prior art signalling devices mentioned above do not appear to address. One aspect is signalling the occurrence of an intermittent gust of high velocity wind that exceeds a predetermined level. The other aspect is a continuous signalling of the wind velocity, whether the velocity is of dangerous levels or not. In this respect, it would be desirable if a wind-responsive device were provided which provided an audible signal upon the occurrence of an intermittent gust of wind that exceeds a predetermined level and that provides a continuous signalling of wind velocity, no matter what the wind velocity is.

When an intermittent gust of wind exceeds a predetermined value, it would be desirable if an audible alarm sounded for a certain period of time to help assure that the residents of a building received the warning signal. It would also be desirable if the audible signal were automatically shut off and reset after an appropriate period of time. In this respect, it would be desirable if a wind-responsive device were provided that sounded an audible alarm signal for the occurrence of a high velocity gust of wind, that continued to signal that occurrence for an appropriate period of time, and that shut itself off and reset itself after the signalling time.

Wind can approach a sensing device from any direction. For a wind-responsive device to accurately detect wind velocity, the wind-responsive device should be able to orient itself into the wind, no matter what direction the wind is coming from. In this respect, it would be desirable if a wind-responsive device were provided which oriented itself into the wind for optimum detection of wind velocity.

Thus, while the foregoing body of prior art indicates it to be well known to use wind-responsive devices to detect and indicate wind velocity, the prior art described above does not teach or suggest a wind velocity signalling apparatus which has the following combination of desirable features: (1) is not susceptible to additive and subtractive effects due to resonance; (2) does not employ a magnetic compass; (3) does not require a complex arrangement of electrical coils, actuators, and gaps to indicate wind velocity and direction; (4) permits remote monitoring of wind velocity; (5) provides an audible signal upon the occurrence of an intermittent gust of wind that exceeds a predetermined level and provides a continuous signalling of wind velocity, no matter what the wind velocity is; (6) sounds an audible alarm signal for the occurrence of a high velocity gust of wind, continues to signal that occurrence for an appropriate period of time, and shuts itself off and resets itself after the signalling time; and (7) orients itself into the: wind for optimum detection of wind velocity. The foregoing desired characteristics are provided by the unique wind velocity signalling apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a wind velocity signalling apparatus which includes a first wind velocity sensing and signalling assembly which is connected to a support structure (such as gabled roof) and which senses and signals the occurrence of wind of a predetermined velocity. An alarm assembly is connected to the first wind velocity sensing and signalling assembly and sounds an alarm upon receiving a signal from the first wind velocity sensing and signalling assembly upon occurrence of the predetermined wind velocity.

The first wind velocity sensing and signalling assembly includes a wind scoop assembly for receiving wind, a wind vane fixed onto the wind scoop assembly for directing the wind scoop assembly into the wind, and a bearing assembly connected between the wind scoop assembly and the roof. The bearing assembly permits the wind scoop assembly to rotate on a first rotational axis with respect to the support structure.

A wind velocity sensor assembly receives wind pressure from wind scooped up by the wind scoop assembly. The wind velocity sensor assembly senses a predetermined wind velocity. The wind velocity sensor assembly includes a wind-pressure-responsive member which is in communication with wind scooped up by the wind scoop assembly. The wind-pressure-responsive member is responsive to a first force exerted by the wind pressure. The wind velocity sensor assembly includes a counterforce assembly for exerting a predetermined counterforce on the wind-pressure-responsive member against the first force exerted by the wind pressure.

The wind velocity sensor assembly also includes an electric circuit completion assembly, connected to the counterforce assembly, for signalling the alarm assembly when the first force exerted by the wind pressure on the wind-pressure-responsive member exceeds the predetermined counterforce exerted by the counterforce assembly on the wind-pressure-responsive member. The counterforce assembly may include a spring for exerting a predetermined counterforce on the wind-pressure-responsive member against the first force exerted by the wind pressure on the wind-pressure-responsive member. Different springs having different spring constants can be employed for exerting different predetermined counterforces.

The electric circuit completion assembly may include a conductive member and a pair of electrical contacts that are capable of being contacted by the conductive member and sending a signal to the alarm assembly when the first force exerted by the wind pressure on the wind-pressure-responsive member exceeds the predetermined counterforce exerted by the counterforce assembly on the wind-pressure-responsive member.

The alarm assembly includes an electric power source for powering the alarm assembly. A sound emitting assembly, powered by the electric power source, sounds an audible alarm upon receiving a signal from the first wind velocity sensing and signalling assembly upon occurrence of the predetermined wind velocity. A timer assembly, powered by the electric power source and connected between the electric power source and the sound emitting assembly, controls sound emission from the sound emitting assembly for a predetermined period of time upon occurrence of the predetermined wind velocity. The electric power source may be a DC battery. Alternately, the power source can be AC power.

A second wind velocity sensing and signalling assembly, connected to the support structure, continuously senses wind velocity and continuously signals the sensed wind velocity to a wind velocity display unit which may be connected to the second wind velocity sensing and signalling assembly. The wind velocity display unit may include a digital display.

The second wind velocity sensing and signalling assembly may be connected to the first wind velocity sensing and signalling assembly which may serve as a support structure for the second wind velocity sensing and signalling assembly, such that the second wind velocity sensing and signalling assembly revolves around the first rotational axis around which the wind scoop assembly rotates. In this case, the second wind velocity sensing and signalling assembly rotates around a second rotational axis as the second wind velocity sensing and signalling assembly respond to the wind. The second rotational axis revolves around the first rotational axis when the wind scoop assembly rotates around the first rotational axis.

A slip ring assembly may be connected between the second wind velocity sensing and signalling assembly and the wind velocity display unit. The slip ring assembly means conveys electrical signals from the second wind velocity sensing and signalling assembly to the wind velocity display unit. The slip ring assembly may include a first slip ring and a second slip ring connected between the second wind velocity sensing and signalling assembly and the wind velocity display unit.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved wind velocity signalling apparatus which has all of the advantages of the prior art and none of the disadvantages.

It is another object of the present invention to provide a new and improved wind velocity signalling apparatus which may be easily and efficiently manufactured and marketed.

It is a further object of the present invention to provide a new and improved wind velocity signalling apparatus which is of durable and reliable construction.

An even further object of the present invention is to provide a new and improved wind velocity signalling apparatus which is susceptible of a low cost of manufacture with regard to both materials and labor, and which accordingly is then susceptible of low prices of sale to the consuming public, thereby making such wind velocity signalling apparatus available to the buying public.

Still yet a further object of the present invention is to provide a new and improved wind velocity signalling apparatus which is not susceptible to additive and subtractive effects due to resonance.

Still another object of the present invention is to provide a new and improved wind velocity signalling apparatus that does not employ a magnetic compass.

Yet another object of the present invention is to provide a new and improved wind velocity signalling apparatus which does not require a complex arrangement of electrical coils, actuators, and gaps to indicate wind velocity and direction.

Even another object of the present invention is to provide a new and improved wind velocity signalling apparatus that permits remote monitoring of wind velocity.

Still a further object of the present invention is to provide a new and improved wind velocity signalling apparatus which provides an audible signal upon the occurrence of an intermittent gust of wind that exceeds a predetermined level and provides a continuous signalling of wind velocity, no matter what the wind velocity is.

Yet another object of the present invention is to provide a new and improved wind velocity signalling apparatus that sounds an audible alarm signal for the occurrence of a high velocity gust of wind, continues to signal that occurrence for an appropriate period of time, and shuts itself off and resets itself after the signalling time.

Still another object of the present invention is to provide a new and improved wind velocity signalling apparatus which orients itself into the wind for optimum detection of wind velocity.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a cross-sectional view of the first wind velocity sensing and signalling assembly shown in FIG. 2 taken along line 3—3 thereof.

FIG. 4 is a cross-sectional view of the alarm assembly shown in FIG. 1.

DESCRIPTION OF THE PREFERRED EMBODIMENT

Figure 2:
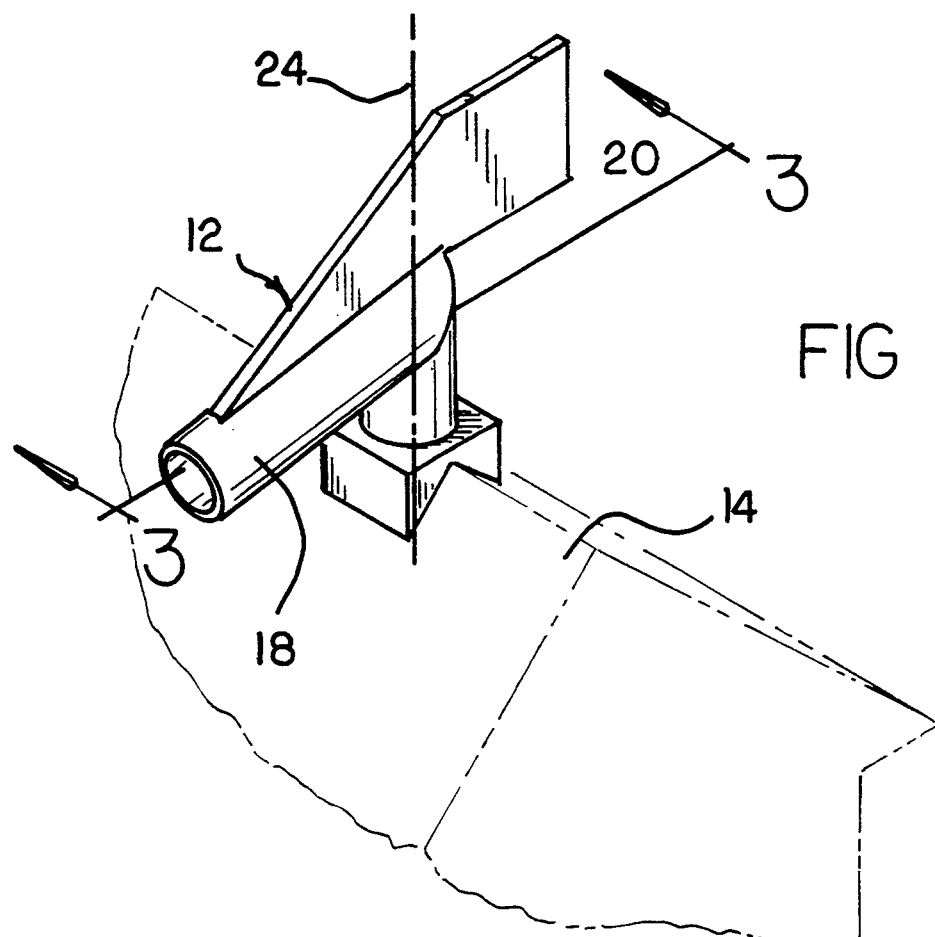
FIG. 2 is a perspective view showing the first wind velocity sensing and signalling assembly shown in FIG. 1 installed on a gabled roof.
Figure 1:
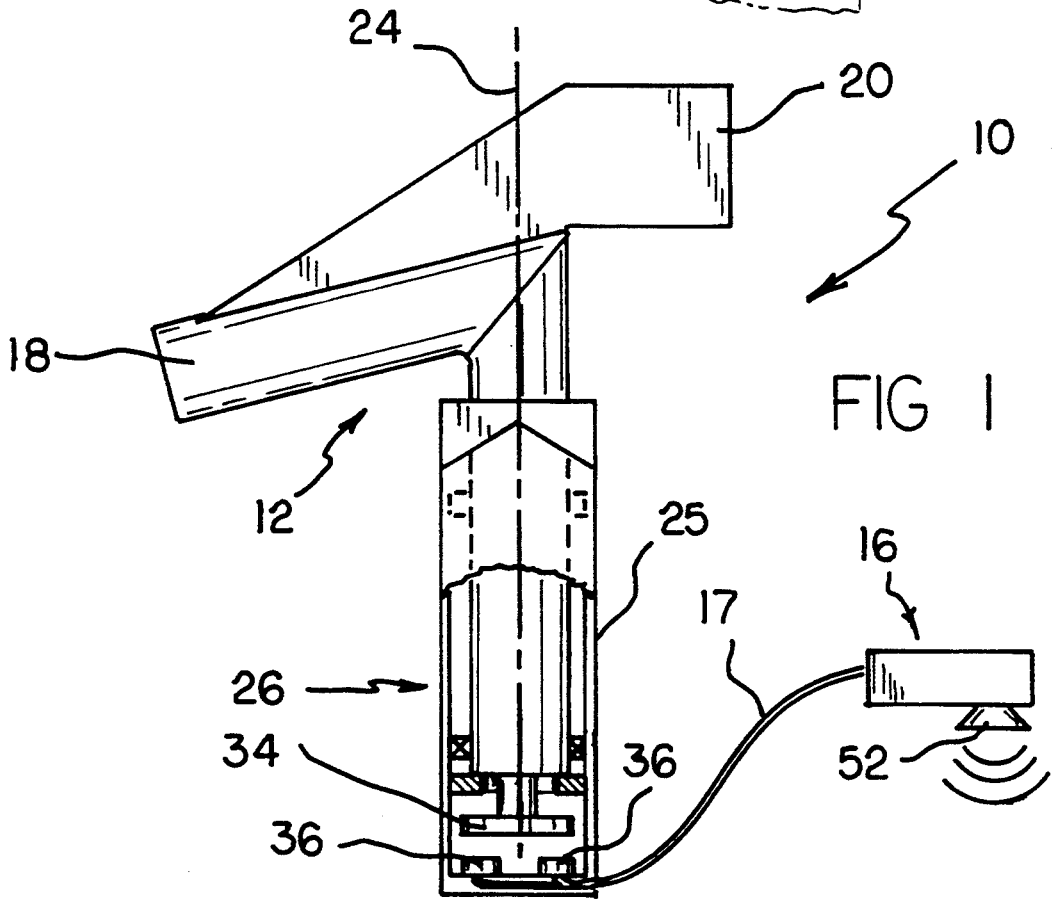
FIG. 1 is a side view of a first embodiment of the wind velocity signalling apparatus of the invention showing a first wind velocity sensing and signalling assembly and an alarm assembly.

With reference to the drawings, a new and improved wind velocity signalling apparatus embodying the principles and concepts of the present invention will be described.

Turning initially to FIGS. 1–4, there is shown a first exemplary embodiment of the wind velocity signalling apparatus of the invention generally designated by reference numeral 10. In its preferred form, wind velocity signalling apparatus 10 includes a first wind velocity sensing and signalling assembly 12 which is connected to a support structure 14 (such as gabled roof 14) and which senses and signals the occurrence of a predetermined velocity. An alarm assembly 16 is connected to the first wind velocity sensing and signalling assembly 12 and sounds an alarm upon receiving a signal from the first wind velocity sensing and signalling assembly 12 upon occurrence of the predetermined wind velocity.

The first wind velocity sensing and signalling assembly 12 includes a wind scoop assembly 18 for receiving wind, a wind vane 20 fixed onto the wind scoop assembly 18 for directing the wind scoop assembly 18 into the wind, and a bearing assembly 22 connected between the wind scoop assembly 18 and the roof 14. The bearing assembly 22 permits the wind scoop assembly 18 to rotate on a first rotational axis 24 with respect to the support structure 14.

A wind velocity sensor assembly 26 receives wind pressure from wind scooped up by the wind scoop assembly 18. The wind velocity sensor assembly 26 senses a predetermined wind velocity. The wind velocity sensor assembly 26 includes a wind-pressure-responsive member 28 which is in communication with wind scooped up by the wind scoop assembly 18. The wind-pressure-responsive member 28 is responsive to a first force exerted by the wind pressure. The wind velocity sensor assembly 26 also includes counterforce assembly 30 for exerting a predetermined counterforce on the wind-pressure-responsive member 28 against the first force exerted by the wind pressure.

The wind velocity sensor assembly 26 also includes an electric circuit completion assembly 32, connected to the counterforce assembly 30, for signalling the alarm assembly 16 when the first force exerted by the wind pressure on the wind-pressure-responsive member 28 exceeds the predetermined counterforce exerted by the counterforce assembly 30 on the wind-pressure-responsive member 28. The counterforce assembly includes a spring 48 for exerting a predetermined counterforce on the wind-pressure-responsive member 28 against the first force exerted by the wind pressure on the wind-pressure-responsive member 28. Different springs 48 having different spring constants can be employed for exerting different predetermined counterforces.

The electric circuit completion assembly 32 includes a conductive member 34 and a pair of electrical contacts 36 that are capable of being contacted by the conductive member 34 and sending a signal to the alarm assembly 16 when the first force exerted by the wind pressure on the wind-pressure-responsive member 28 exceeds the predetermined counterforce exerted by the counterforce assembly 30 connected to the wind-pressure-responsive member 28 through shaft 29. It is noted that the counterforce assembly 30, including the wind-pressure-responsive member 28, the spring 48, the shaft 29, and the conductive member 34 rotate along with the wind scoop assembly 18 and the wind vane 20 around the first rotational axis 24. It is also noted that a housing 25, which houses the electrical contacts 36 and the cable 17, remains stationary as the counterforce assembly 30 rotates around the first rotational axis 24.

The alarm assembly 16 includes an electric power source 50 for powering the alarm assembly 16. A sound emitting assembly 52, powered by the electric power source 50, sounds an audible alarm upon receiving a signal from the first wind velocity sensing and signalling assembly 12 when conductive member 34 contacts the pair of electrical contacts 36 upon occurrence of the predetermined wind velocity. A timer assembly 57, powered by the electric power source 50 and connected between the electric power source 50 and the sound emitting assembly 52, controls sound emission from the sound emitting assembly 52 for a predetermined period of time (e.g. three minutes) upon occurrence of the predetermined wind velocity. The electric power source 50 is a DC battery. Alternately, the power source can be AC power. The first wind velocity sensing and signalling assembly 12 is connected to the alarm assembly 16 by cable 17.

Figure 5:
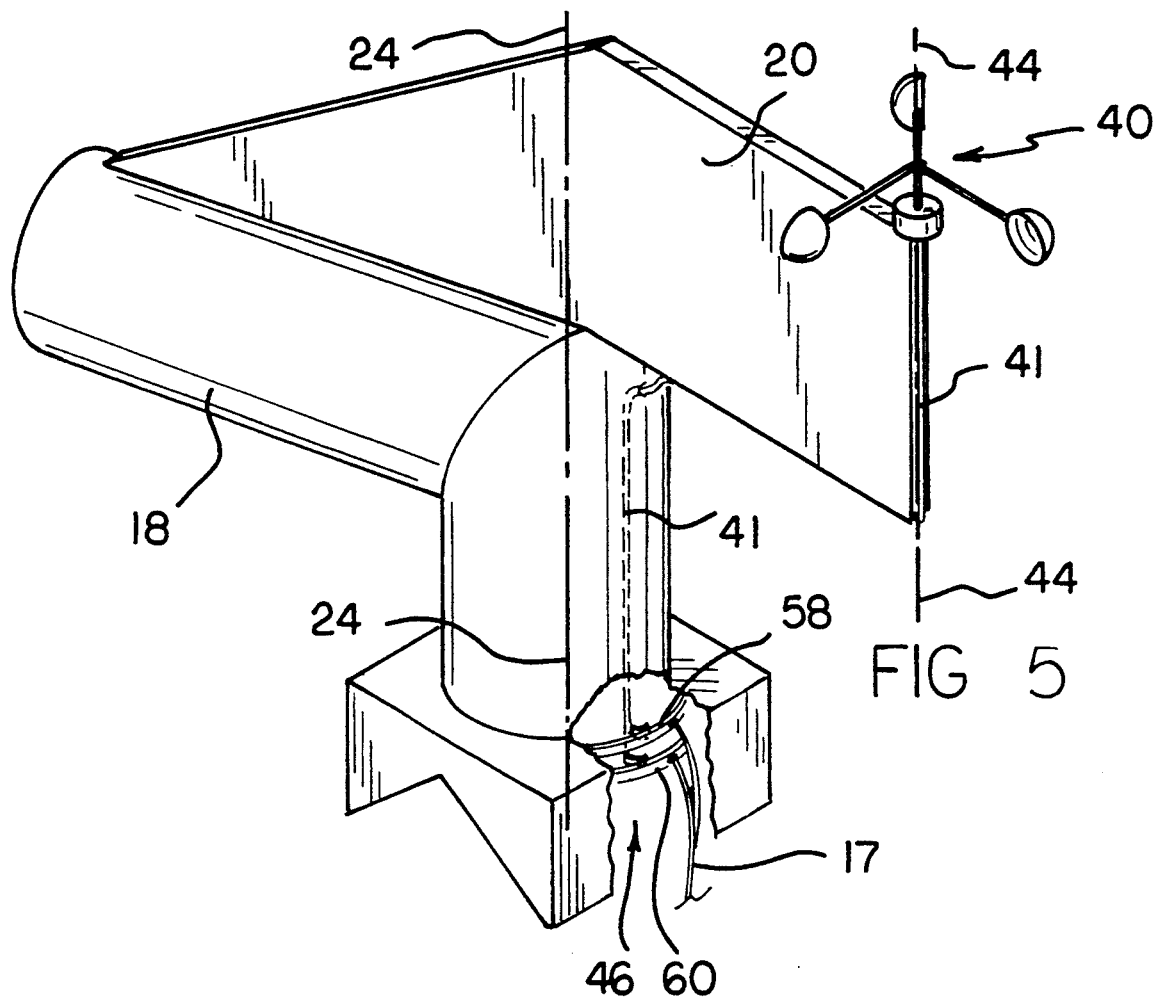
FIG. 5 is a perspective view, in partial cross-section, of a second embodiment of the wind velocity signalling apparatus of the invention which includes a second wind velocity sensing and signalling assembly installed on the wind vane of the first wind velocity sensing and signalling assembly.
Figure 6:
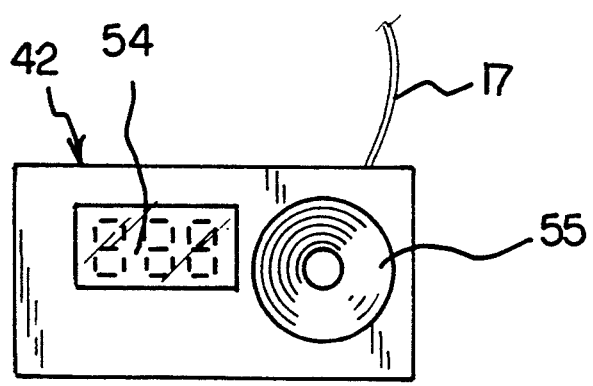
FIG. 6 is a side view of a combined alarm assembly and digital readout for the signalling the occurrence of an intermittent wind gust and a continuous display of wind velocity, respectively, in combination with the first wind velocity sensing and signalling assembly and the second wind velocity sensing and signalling assembly shown in FIG. 5.

Turning to FIGS. 5-6, a second embodiment of the invention is shown. Reference numerals are shown that correspond to like reference numerals that designate like elements shown in the other figures. In addition, a second wind velocity sensing and signalling assembly 40, connected to the support structure continuously senses wind velocity and continuously signals the sensed wind velocity to a wind velocity display unit 42 which is connected to the second wind velocity sensing and signalling assembly 40. The second wind velocity sensing and signalling assembly means 40 can be a meteorological instrument known as an anemometer. The wind velocity display unit 42 includes both a digital display 54 and an audible alarm speaker 55.

The second wind velocity sensing and signalling assembly 40 is connected to the wind vane 20 of the first wind velocity sensing and signalling assembly 12 which serves as a support structure for the second wind velocity sensing and signalling assembly 40, such that the second wind velocity sensing and signalling assembly 40 revolves around the first rotational axis 24 around which the wind scoop assembly 18 rotates. The second wind velocity sensing and signalling assembly 40 rotates around a second rotational axis 44 as the second wind velocity sensing and signalling assembly 40 respond to the wind. The second rotational axis 44 revolves around the first rotational axis 24 when the wind scoop assembly 18 rotates around the first rotational axis 24.

A slip ring assembly 46 is connected between the second wind velocity sensing and signalling assembly 40 and the wind velocity display unit 42. The slip ring assembly 46 conveys electrical signals from the second wind velocity sensing and signalling assembly 40 to the wind velocity display unit 42. The slip ring assembly 46 includes a first slip ring 58 and a second slip ring 60 connected to the second wind velocity sensing and signalling assembly 40 by way of respective conductors in cable 41. Each respective slip ring 58 and 60 is connected to cable 17 by a respective conductor.

The components of the wind velocity signalling apparatus of the invention can be made from inexpensive and durable metal or plastic materials. Conventional electrical components can be used for the alarm assembly and digital display.

The first wind velocity sensing and signalling assembly of the wind velocity signalling apparatus of the invention can be mounted on the roof of a structure. The roof can be flat or gabled. The second wind velocity sensing and signalling assembly can be mounted inside the building so as to be readily heard and seen by residents of the building.

The wind velocity signalling apparatus of the invention can be sold as part of the new construction of homes, buildings (such as schools, office buildings, etc.), and mobile homes. The wind velocity signalling apparatus can also be sold in kit form for installation on existing homes and buildings.

It is apparent from the above that the present invention accomplishes all of the objects set forth by providing a new and improved wind velocity signalling apparatus that is low in cost, relatively simple in design and operation, and which is not susceptible to additive and subtractive effects due to resonance. Also, with the invention, a wind velocity signalling apparatus is provided which does not employ a magnetic compass. With the invention, a wind velocity signalling apparatus is provided which does not require a complex arrangement of electrical coils, actuators, and gaps to indicate wind velocity and direction. With the invention, a wind velocity signalling apparatus is provided which permits remote monitoring of wind velocity. With the invention, a wind velocity signalling apparatus is provided which provides an audible signal upon the occurrence of an intermittent gust of wind that exceeds a predetermined level and provides a continuous signalling of wind velocity, no matter what the wind velocity is. With the invention, a wind velocity signalling apparatus is provided which sounds an audible alarm signal for the occurrence of a high velocity gust of wind, continues to signal that occurrence for an appropriate period of time, and shuts itself off and resets itself after the signalling time. With the invention, a wind velocity signalling apparatus is provided which orients itself into the wind for optimum detection of wind velocity.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved wind velocity signalling apparatus, comprising:

first wind velocity sensing and signalling assembly means, connected to a support structure, for sensing and signalling wind of a predetermined velocity, wherein said first wind velocity sensing and signalling assembly means include a wind scoop assembly for receiving wind, a wind vane fixed onto said wind scoop assembly for directing said wind scoop assembly into the wind, bearing assembly means, connected between said wind scoop assembly and the support structure, for permitting said wind scoop assembly to rotate on a first rotational axis with respect to the support structure, and a wind velocity sensor assembly mounted along said first rotational axis, receiving wind pressure from wind scooped up by said wind scoop assembly, for sensing a predetermined wind velocity, said wind velocity sensor assembly including a wind-pressure-responsive member in communication with wind scooped up by said wind scoop assembly and responsive to a first force exerted by the wind pressure, said wind velocity sensor assembly also including counterforce assembly means for exerting a predetermined counterforce on said wind-pressure-responsive member against said first force exerted by the wind pressure, said wind velocity sensor assembly also including electric circuit completion assembly means, connected to said counterforce assembly means, for signalling said alarm assembly means when the first force exerted by the wind pressure on the wind-pressure-responsive member exceeds the predetermined counterforce exerted by the counterforce assembly means on said wind-pressure-responsive member, wherein said counterforce assembly means include a spring for exerting a predetermined counterforce on said wind-pressure-responsive member against said first force exerted by the wind pressure on said wind-pressure-responsive member, wherein said electric circuit completion assembly means include a conductive member and a pair of electrical contacts that are capable of being contacted by said conductive member and sending a signal to said alarm assembly means when the first force exerted by the wind pressure on the wind-pressure-responsive member exceeds the predetermined counterforce exerted by the counterforce assembly means on said wind-pressure-responsive member, wherein said counterforce assembly means, said wind-pressure-responsive member, said spring, said shaft, and said conductive member rotate along with said wind scoop assembly and said wind vane around a first rotational axis, and alarm assembly means, connected to said first wind velocity sensing and signalling assembly means, for sounding an alarm upon receiving a signal from said first wind velocity sensing and signalling assembly means, upon occurrence of said predetermined wind velocity.

2. The apparatus described in claim 1 wherein the support structure for supporting said first wind velocity sensing and signalling assembly means is a roof of a building.

3. The apparatus described in claim 1 wherein said alarm assembly means include:

an electric power source for powering said alarm assembly means, a sound emitting assembly, powered by said electric power source, for sounding an audible alarm upon receiving a signal from said first wind velocity sensing and signalling assembly means upon occurrence of said predetermined wind velocity, and a timer assembly, powered by said electric power source and connected between said electric power source and said sound emitting assembly, for controlling sound emission from said sound emitting assembly for a predetermined period of time upon occurrence of said predetermined wind velocity.

4. The apparatus described in claim 3 wherein said electric power source is a DC battery.

* * * * *